US008211835B2

(12) United States Patent
Howard et al.

(10) Patent No.: US 8,211,835 B2
(45) Date of Patent: Jul. 3, 2012

(54) COMPOSITION AND METHOD FOR SLICKWATER APPLICATION

(75) Inventors: Paul R. Howard, Sugar Land, TX (US);
Curtis L. Boney, Houston, TX (US);
Shawn McCleskey Rimassa, Houston, TX (US); Syed A. Ali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/887,181

(22) Filed: Sep. 21, 2010

(65) Prior Publication Data

US 2011/0071058 A1     Mar. 24, 2011

Related U.S. Application Data

(60) Provisional application No. 61/245,513, filed on Sep. 24, 2009.

(51) Int. Cl.
    C09K 8/588     (2006.01)
    C02F 5/14     (2006.01)
    E21B 43/26     (2006.01)

(52) U.S. Cl. .......... 507/225; 166/305.1; 166/308.1; 166/308.2; 507/235; 507/269; 507/95; 507/920; 507/922

(58) Field of Classification Search .......... 507/225, 507/235, 269, 905, 920, 922; 166/305.1, 166/308.1, 308.2
See application file for complete search history.

(56) References Cited

U.S. PATENT DOCUMENTS

| 3,370,957 | A | 2/1968 | Wagner et al. |
| 3,443,882 | A | 5/1969 | Flynn |
| 3,482,636 | A | 12/1969 | Crowe |
| 3,733,266 | A | 9/1971 | Bishop et al. |
| 3,853,771 | A | 12/1974 | Felmann et al. |
| 4,016,195 | A | 4/1977 | Pintschovius et al. |
| 4,184,953 | A | 1/1980 | Allinson et al. |
| 4,451,267 | A | 5/1984 | Schwab et al. |
| 4,620,595 | A | 11/1986 | Schutt |
| 4,701,247 | A | 10/1987 | Kalnins et al. |
| 4,818,412 | A | 4/1989 | Conlan |
| 4,846,981 | A | 7/1989 | Brost |
| 4,995,987 | A | 2/1991 | Whitekettle et al. |
| 4,997,571 | A | 3/1991 | Roensch et al. |
| 5,016,714 | A | 5/1991 | McCabe et al. |
| 5,069,286 | A | 12/1991 | Roensch et al. |
| 5,118,426 | A | 6/1992 | Duncan et al. |
| 5,336,729 | A | 8/1994 | Fong et al. |
| 5,405,531 | A | 4/1995 | Hitzman et al. |
| 5,413,178 | A | 5/1995 | Walker et al. |
| 5,776,875 | A | 7/1998 | Tang et al. |
| 5,942,126 | A | 8/1999 | Dallmier et al. |
| 5,955,401 | A | 9/1999 | Liao |
| 6,110,875 | A | 8/2000 | Tjon-Joe-Pin et al. |
| 6,162,371 | A | 12/2000 | Rees et al. |
| 6,533,958 | B2 | 3/2003 | Shim et al. |
| 6,814,144 | B2 | 11/2004 | Jones |
| 7,090,016 | B2 | 8/2006 | Lee et al. |
| 7,219,735 | B2 | 5/2007 | Smith et al. |
| 7,231,973 | B2 | 6/2007 | Sloan |
| 7,287,593 | B2 | 10/2007 | Hutchins et al. |
| 7,455,112 | B2 | 11/2008 | Moorehead et al. |
| 7,578,968 | B1 | 8/2009 | Nalepa et al. |
| 2003/0092581 | A1 | 5/2003 | Crews |
| 2004/0120853 | A1 | 6/2004 | Carpenter et al. |
| 2005/0238729 | A1 | 10/2005 | Jenneman et al. |
| 2006/0116296 | A1 | 6/2006 | Kippie et al. |
| 2007/0102359 | A1 | 5/2007 | Lombardi et al. |
| 2008/0032949 | A1 | 2/2008 | Jones et al. |
| 2008/0099207 | A1 | 5/2008 | Venditto et al. |
| 2008/0115930 | A1 | 5/2008 | Peters et al. |
| 2008/0160612 | A1 | 7/2008 | Selkon |
| 2008/0200355 | A1 | 8/2008 | Emmons |
| 2009/0038799 | A1* | 2/2009 | Garcia-Lopez de Victoria et al. ............... 166/280.2 |
| 2009/0062156 | A1 | 3/2009 | Wilson et al. |
| 2009/0229827 | A1* | 9/2009 | Bryant et al. ............... 166/308.1 |
| 2010/0048429 | A1 | 2/2010 | Dobson, Jr. et al. |

FOREIGN PATENT DOCUMENTS

| EP | 0491391 | 5/1996 |
| GB | 2239032 | 6/1991 |
| WO | 2008089120 | 7/2008 |

OTHER PUBLICATIONS

SPE18517—The Effects of Reducing Bleach Concentration to Cleanup Bacterial Formation Damage—Cusak, F., Lappin-Scott, H.M. and Costerton,1966 Society of Petroleum Engineers.
SPE75204—A New Approach to the Determination of Polymer Concentration in Reservoir Rock Adsorption Tests. Mezzomo, R.F., Moczydlower, P., Sanmartin, A.N., and Araujo, C.H.V. 2002 Society of Petroleum Engineers, Inc. Presented at the SPE/DOE Thirteenth Symposium on Improved Oil Recovery held in Tulsa, Oklahoma, Apr. 13-17, 2002.
SPE92702—Bromine-Based Biocides for Effective Microbiological Control in the Oil Field—Carpenter, J.F., Nalepa, C.J. 2005 Society of Petroleum Engineers Inc. 2005 SPE International Symposium on Oilfield Chemistry, Houston, Texas Feb. 2-4, 2005.
Biocide Testing Against Corrosion-Causing Oil-Field Bacteria Helps Control Plugging. Ruseska, I., Robbins, J., Costerton, J.W., Lashen, E.S., Technology Mar. 8, 1982, Oil & Gas Journal.
Chemical Mitigation of Corrosion by Chlorine Dioxide in Oilfield Water-floods—Prues, W., Lee, E.S. and Kossell, L.—National Association of Corrosion Engineers, Materials Performance V24, May 1985.
Chlorine Theory & Measurement—IC Controls 2005, Technical Notes Issue 8-2. Downloaded Apr. 2009 from website: htty://www.iccontrols.com/files/8-2.pdf.
The Effect of Alkalinity on the Use of Hypochlorites—Rideal, E. and Evans, U.R.—Review Journal Society Chemical Industry V40, 1920, pp. 64R-66R. 1921.

(Continued)

Primary Examiner — Timothy J. Kugel
(74) Attorney, Agent, or Firm — Michael Dae; Daryl Wright; Robin Nava

(57) ABSTRACT

The invention provides an environmentally friendly composition including a friction reducer, a biocide, a scale inhibitor, and optionally a clay stabilizer.

23 Claims, No Drawings

OTHER PUBLICATIONS

Evaluation of Slime-Producing Bacteria in Oil Field Core Flood Experiments—Geesey, G.G., Mittleman, M.W., and Lieu, V.T.—American society for Microbiology—Applied and Environmental Microbiology Feb. 1987, pp. 278-283.

Factors Affecting Germicidal Efficiency of Chlorine and Chloramine—Weber, G.R. and Levine, M.—American Journal ofPublic Health, Jul. 1944. vol. 34, pp. 719-728.

Germicidal Power of Sodium Hypochlorite, Effect of Addition of Alkali—Johns, C.K.—Industrial and Engineering Chemistry, vol. 2, No. 7, pp. 787-788. American Chemical Society.

Manual and Automated Turpidimetric Methods for the Determination of Polyacrylamides in the Presence of Sulfonates—Kuehne, D.L., Shaw, D.W. 1985 Society of Petroleum Engineers. Society of Petroleum Engineers Journal, Oct. 1985, pp. 687-692.

Stimulation of Water Injection Wells in the Los Angeles Basin by Using Sodium Hypochlorite and Mineral Acids—Clementz, D.M., Patterson, D.E., Aseltine, R.J., Young, R.E. Sep. 1982, Journal of Petroleum Technology, pp. 2087-2096.

The Use of Chlorine Dioxide in a Late Life Waterflood—Sacco, F.J.—American Chemical Society. Division of Petroleum Chemistry 29:22, 605-606, American Chemical Society, 1984.

SPE6677—The Forties Field Sea-Water Injection System—Mitchell, R.W., 1978 Society of Petroleum Engineers of AIME, Journal of Ptroleum Technology. pp. 877-884.

SPE7765—Fateh Field Sea Water Injection—Water Treatment, Corrosion, and Scale Control—Nassivera, M. and Essel, A. 1979 Society of Petroleum Engineers. Mar. 25-29, 1979, Middle East Oil Technical Conference of the Society of Petrolem, Manama, Bahrain.

SPE14821—Remedial Methods for Bacterial Formation Damage by Application of Oxidizers—Ghalambor, A., Hayatdavoudi, A., Beladi, K. Mathemeier, P.F. 1986 Society of Petroleum Engineers. Feb. 26-27, 1986 Seventh SPE Symposium on Formation Damage Control of the Society of Petroleum Engineers—Lafayette, LA.

SPE16907—Diagnosis and Removal of Microbial/Fines Plugging in Water Injection Wells. Cusack, F., McKinley, V.L., Lappin-Scott, H.M., Brown, D.R., Clementz, D.M., Costerton, J.W.. 1987 Society of Petroleum Engineers. Presented at the 62nd Annual Technical Conference and Exhibition of the Society of Petroleum Engineers held in Dallas, TX Sep. 27-30, 1987.

SPE68651—Towards Environmentally-Friendly Additives for Well Completion and Stimulation Operation, Rae, P., Di Lullo, G., Ahmad, A. B. 2001 Society of Petroleum Engineers. Presensted at the SPE Asia Pacific Oil and Gas Conference and Exhibition held in Jakarta, Indonesia, Apr. 17-19, 2001.

SPE92795—Use of Nitrate to Mitigate Reservoir Souring in Bonga Deepwater Development, Offshore Nigeria. Kuijvenhoven, C., Bostock, A., Chappell, D., Noirot, J.C. and Khan, A. 2005 SPE International Symposium on Oilfield Chemistry, Houston, Feb. 2-4.

SPE121038—Evaluating Implications of Hydraulic Fracturing in Shale Gas Reservoirs. Arthur, J. D., Bohm, B., Coughlin, B.J., Layne, M. 2009 Society of Petroleum Engineers. Presented at the 2009 SPE Americans E&P Environmental & Safety Conference held in San Antonio, Texas, USA, Mar. 23-25, 2009.

Control of Microbial Souring by Nitrate, Nitrite or Glutaraldehyde Injection in a Sandstone Column. Reinsel, M.A., Sears, J.T., Steward, P.S. and McInerey, M.J. Journal of Industrial Microbiology (1996) 17, pp. 128-136.

Synergistic Inhibition of Microbial Sulfide Production by Combinations of the Metabolic Inhibitor Nitrite and Biocides. Greene, E.A., Brunelle, V., Jenneman, G.E., Voordouw, G. Applied and Environmental Microbiology, Dec. 2006, pp. 7897-7901. vol. 72, No. 12. American Society for Microbiology.

The Use of Hypochiorous Acid Generated by Electrolysis for the Treatment of Pathogens and Spoilage Microorganisms on Meat Products. Veasey, S.R. And Muriana, P.M. (downloaded Sep. 27, 2010 from: www.ansi.okstate.edu/research/2007rr/veasey_007.pdf) 2007 Oklahoma Agricultural Experiment Station.

Use of Microbiocides in Barnett Shale Gas Well Fracturing Fluids to Control Bacteria Related Problems. Fichter, J. K., Johnson, K., French, K., and Oden, R. NACE International—Corrosion 2008 Conference & Expo.

* cited by examiner

COMPOSITION AND METHOD FOR SLICKWATER APPLICATION

CROSS-REFERENCE TO RELATED APPLICATIONS

This application claims the benefit of U.S. Provisional Application No. 61/245,513, filed Sep. 24, 2009.

FIELD OF THE INVENTION

This invention relates generally to composition and method for treating a well penetrating a subterranean formation. More specifically, the invention relates to environmentally friendly treatment fluids and associated methods of use for slickwater application.

BACKGROUND

Some statements may merely provide background information related to the present disclosure and may not constitute prior art.

The recent increase of shale gas development in a number of areas around the world has heightened public awareness and concern regarding hydraulic fracturing. Shale gas development entails fracturing operations using large volumes of water (generally 3 to 5 million gallons per well), and small amounts of chemical additives to fracture the horizontal wells. While general descriptions of the constituents of these additives and their purposes are publicly available, the precise additive compositions are kept proprietary by the service companies. Much of the public residing in the shale gas basins is unfamiliar with oil and gas drilling and production activities, creating a perception of industry "secrecy" surrounding additive compositions and leading the public to distrust service companies. As a result, various non-governmental organizations and public interest groups have been working to raise the alarm about potential groundwater contamination and possible chemical exposure.

Especially, in the United States, on Jun. 9, 2009, legislation was introduced in both houses of the United States Congress to amend section 1421(d) of the Safe Drinking Water Act (42 USC300h(d)). This legislation was introduced by Diana DeGette, D-Colo., Maurice Hinchey, D-N.Y., and Jared Polis, D-Colo., in the U.S. House of Representatives and by Sen. Bob Casey, D-Pa., and Sen. Chuck Schumer, D-N.Y., in the Senate. The House and Senate bills are both referred to as the "Fracturing Responsibility and Awareness of Chemicals (FRAC) Act", and propose repealing the 2005 Energy Policy Act exemption of hydraulic fracturing from UIC regulation under the SDWA. As such, the bills would require disclosure to regulatory and emergency medical staff of the chemical constituents utilized in the hydraulic fracturing process.

Thus, there are unfulfilled needs for environmentally friendly treatment fluids in the hydraulic fracturing.

The present disclosure covers the use of a set of environmentally improved products to make a slickwater fluid which has no solvent, or hazardous material in it. The composition includes a friction reducer, a biocide, a scale inhibitor, and optionally a clay stabilizer.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the embodiments of the invention and should not be construed as a limitation to the scope and applicability of the invention. While the compositions of the invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

The following definitions are provided in order to aid those skilled in the art in understanding the detailed description of the invention.

The term "fracturing" refers to the process and methods of breaking down a geological formation and creating a fracture, i.e. the rock formation around a well bore, by pumping fluid at very high pressures, in order to increase production rates from a hydrocarbon reservoir. The fracturing methods otherwise use conventional techniques known in the art.

The term "surfactant" refers to a soluble or partially soluble compound that reduces the surface tension of liquids, or reduces inter-facial tension between two liquids, or a liquid and a solid by congregating and orienting itself at these interfaces.

In a first aspect, an environmentally improved slickwater fracturing fluid is disclosed. The composition comprises: a friction reducer, a biocide, and a scale inhibitor. If the fracturing treatment is being performed with flowback or produced water which already contains sufficient salts to prevent clay swelling, no clay stabilizer is needed. In a further aspect, the composition can comprise a clay stabilizer.

The friction reducer is a solution containing no solvent or surfactant (salt solution, or bi-phasic blend). The friction reducer may be tolerant to divalent ions giving high drag reduction in produced or flowback water. This allows for the use of the inorganic clay stabilizer The biocide does not contain an inherent poison to mammals (hypochlorous acid or another oxidizer in solution). The biocide is benign and is safer to handle. This could include hypochlorous acid, or bromide solutions. It could also include a mixture of biocides and bacteria growth suppressor.

The scale inhibitor is a solid which is slow dissolving and preferably 100% active. This scale inhibitor will have very low toxicity to mammals or fish. It may be a phosphorous containing material or acrylic acid based.

The clay stabilizer is based on mono or divalent inorganic or organic ions in a liquid form with water.

In one embodiment, the friction reducer is polyacrylamide in salt solution. The friction reducer may be an acrylamide copolymer comprising 1 to 60 mole percent (2-acrylamido-2-hydroxy alkyl) lower trialkyl ammonium salt groups. In an embodiment, the lower trialkyl groups are methyls. The acrylamide copolymer has a molecular weight in the range of 1,000 to 20,000,000, preferably in the range of 5,000-10,000,000; and more preferably in the range of 100,000-5,000,000. The anion of the salt group may be selected from the group consisting of chlorine, bromine and methyl sulfate.

An example of chemistry may be commercial product sold by Nalco under the name ASP-900. The advantage of this product is that the polyacrylamide amps co-polymer is packaged in a salt solution rather than being an invert emulsion. Conventional friction reducers today are in the form of an invert emulsion. The emulsions polymer molecules are held in a water droplet surrounded by an oil continuous phase. Surfactants are added to these typical friction reducers to help the emulsion to invert quickly when the products are diluted in water.

Polyacrylamide in salt solution is environmentally friendly. It contains no solvent or surfactants. The current friction reducer has two advantages over dry polymer technology. First the concentration of polymer (and associated cost) is lower with this friction reducer solution. This leads to less potential polymer damage from the polyacrylamide friction reducer left in the fracture. The second advantage is that the friction reducer solution product is a liquid. It can be added and adjusted quickly and easily at the blender. Solid friction reducers always require more time to hydrate.

Also, polyacrylamine in salt solution allows for the use of an inorganic clay stabilizer.

Polyacrylamide in salt solution gives full drag reduction almost instantaneously in very high salinity brines (flowback and produced water). This occurs because the polymer does not have to invert. It merely expands in solution.

Polyacrylamide in salt solution is extremely efficient in divalent brines. This allows use with clay stabilizer. Emulsion type friction reducers would be slow to hydrate with the divalent ions of the clay stabilizer in the fluid.

Typical concentrations of friction reducer are 0.1 gpt to 1.5 gpt. The preferred range is 0.25 to 0.75 gpt.

In a second embodiment, the friction reducer is a bi-phase solution. In this case the friction reducer would still be an acrylamide AMP co-polymer to give divalent ion robustness, and the possible second phase in the blend could be a polymer such as guar. More details are explained in U.S. patent application number 2009-0023614, which is incorporated by reference herewith. Some embodiments are based upon two-phase polymer-polymer systems achievable with polymers of interest to the oilfield, e.g. viscosifiers, friction reducers, etc. Some examples of polymers include polymers that are either crosslinked or linear, or any combination thereof. Polymers include natural polymers, derivatives of natural polymers, synthetic polymers, biopolymers, and the like, or any mixtures thereof. An embodiment uses any friction-reducing polymer used in the oil industry to reduce friction pressure losses at high pumping rates, e.g. in slickwater systems. Some non-limiting examples of suitable polymers include: polysaccharides, such as, for example, guar gums, high-molecular weight polysaccharides composed of mannose and galactose sugars, including guar derivatives such as hydropropyl guar (HPG), carboxymethyl guar (CMG), and carboxymethylhydroxypropyl guar (CMHPG), and other polysaccharides such as xanthan, diutan, and scleroglucan; cellulose derivatives such as hydroxyethyl cellulose (HEC), hydroxypropyl cellulose (HPC), carboxymethlyhydroxyethyl cellulose (CM-HEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble.

In one embodiment, the biocide is hypochlorous acid solution made by electrochemical activation with a pH in the range of 3.5-8.5.

An example of chemistry may be commercial product sold by Benchmark under the name Excelyte™. This is an oxidizer chemical consisting of a dilute solution of hypochlorous acid. This product gives a very effective and rapid bacterial kill. It is non-persistent. It is much less toxic then typical biocides used in the oil industry such as gluteraldehyde or THPS. Typical concentrations in the fluid vary with the amount required. They probably range from 0.5 gpt to 75 gpt. The preferred range is 5 to 50 gpt of this solution.

Electrochemical activation (ECA) is a technology for generating meta-stable substances from water and compounds dissolved in it through electrochemical exposure the weak saline solution is altered temporarily to produce meta-stable solutions without the addition of chemical reagents. As a physical and chemical process, electrochemical activation is a combination of electrochemical and electrophysical influences on water containing ions and molecules of dissolved substances on the surface of the electrode (either anode or cathode) and in conditions of non-equilibrium transfer of a charge by electrons through the "electrode-electrolyte" ceramic membrane.

As a result of chemical activation, water becomes meta-stable (activated) for several hours, possessing increased reactivity which can be used in different physiochemical processes. Water activated at the cathode electrode (catholyte) demonstrates high electron activity and antioxidant properties. Correspondingly, water activated at the anode (anolyte) possesses low electron activity and oxidizing properties.

Electrochemical activation allows for an enhanced alteration of the dissolved gases, acidic, basic and oxidizing properties of water without the addition of chemical regulation, and to synthesize meta-stable chemicals (oxidants and anti-oxidants) from water and substances dissolved in it. The effect of water meta-stability from the ECA process is the basis for its use in conditioning, purification, and decontamination, as well as for transforming water, or diluted electrolyte solutions, into environmentally friendly, anti-microbial, detergent, extractive and other solutions which may be synthesized on-site by special ECA devices.

ECA uses 0.001-1.0% saline solutions, or ordinary tap water, to generate environmentally friendly, highly active solutions of oxidizing anolyte and/or anti-oxidizing catholyte solutions. Anolyte oxidizing solutions have a pH range of 3.5-8.5 and an oxidation-reduction potential (ORP) of +600 to +1200 mV. The anolyte is the biocide, at concentrations as low as one ppm to free available chlorine (FAC). Anolyte can be generated on-site for the treatment of small to extremely large volumes of water which may be injected, produced or stored during oil and gas field operations. Almost all bacteria, or biological species that occur as contaminants in petroleum field or facility operations, can be destroyed or controlled with a relatively low FAC concentration. Competitively priced anolyte solutions may be produced at the site on a mobile unit, or transported to the work site in bulk after being produced at a central generation facility. The pH of produced solutions may be regulated without the need for acid or caustic buffers, descalers and corrosion inhibitors.

In one embodiment, the scale inhibitor is calcium, magnesium, sodium, phosphate or a mixture thereof in frit or glassified material.

An example of chemistry may be commercial product sold by Nalco under the name ASP529. The scale inhibitor used in this package is a dry granular product. This product has the advantage that it is pumped and handled as a solid in the fracturing application. It then slowly dissolves releasing scale inhibitor into the flowback. This product has no solvents or surfactants in it. This is an advantage over liquid scale inhibitors. In the slickwater shale fracturing applications there is very little reservoir water produced. Therefore the concentration of solid scale inhibitor is such to treat scale in the fracturing fluid water as it flows back. Typical concentration of the solid scale inhibitor is 0.05 to 1 ppt. The preferred concentration is 0.1 to 0.5 ppt.

In one embodiment, the clay stabilizer is a salt such as potassium chloride, choline chloride or sodium chloride in water. In a second embodiment, the clay stabilizer is a mixture of salts made of potassium chloride, sodium chloride, magnesium chloride and calcium chloride in water.

It is a mixture of salts for temporary clay stabilization and comes in liquid form. Therefore it is preferred for the high addition rates needed in slickwater fracturing. It also has the advantage of being on a liquid form, and does not require the operational step of mixing dry salt into a liquid concentrate, or into water tanks prior to use on the treatment. The clay stabilizer in this fluid also has the advantage of being less toxic that typical amine based liquid clay stabilizers such as TMAC. Typical concentrations of clay stabilizer are 2 gpt.

In some embodiment, the composition may further include a surfactant. In other embodiment, the composition does not include a surfactant.

What is claimed is:

1. An aqueous environmentally friendly composition for use in oilfield application containing no surfactant and comprising:
   a friction reducer comprising an acrylamide copolymer and a salt in water;
   a biocide comprising an oxidizer diluted in water;
   and a scale inhibitor comprising a phosphorous compound in solid form.

2. The composition of claim 1, wherein the acrylamide copolymer comprises 1 to 60 mole percent (2-acrylamido-2-hydroxy alkyl) lower trialkyl ammonium groups.

3. The composition of claim 2, wherein the lower trialkyl groups are methyls.

4. The composition of claim 2, wherein the anion of the lower trialkyl ammonium group is selected from the group consisting of chlorine, bromine and methyl sulfate.

5. The composition of claim 1, further comprising a clay stabilizer.

6. The composition of claim 5, wherein the clay stabilizer is selected from the group consisting of potassium chloride, sodium chloride, magnesium chloride, calcium chloride, choline chloride, and mixture thereof.

7. The composition of claim 1, wherein the acrylamide copolymer has a molecular weight in the range of 1,000 to 20,000,000.

8. The composition of claim 1, wherein the oxidizer diluted in water is an hypochlorous acid solution with a pH in the range of 4-7.5.

9. The composition of claim 1, wherein the oxidizer is bromide.

10. The composition of claim 1, wherein the scale inhibitor comprises calcium, magnesium, sodium, phosphate or a mixture thereof.

11. The composition of claim 1, wherein the scale inhibitor is in granular form.

12. The composition of claim 1, wherein the scale inhibitor is in frit form.

13. A method to treat a well penetrating a subterranean formation, comprising:
   providing a composition containing no surfactant comprising a friction reducer comprising an acrylamide copolymer and a salt in water; a biocide comprising an oxidizer diluted in water; and a scale inhibitor comprising a phosphorous compound in solid form;
   and introducing the composition in the well.

14. The method of claim 13, wherein the composition is mixed in water and the method is hydraulic fracturing.

15. The method of claim 14, comprising the step of injection the composition in water at a pressure above the fracturing pressure of the subterranean formation.

16. The method of claim 15, further comprising the step of injecting the composition in water at a pressure below the fracturing pressure of the subterranean formation.

17. The method of claim —, comprising further the step of injecting the composition in water at a pressure below the fracturing pressure of the subterranean formation.

18. The method of claim 17, wherein the water is produced water.

19. A method to treat a well penetrating a subterranean formation, comprising:
   providing a composition comprising a friction reducer comprising an acrylamide copolymer and a salt in water; a biocide comprising hypochlorous acid diluted in water; and a scale inhibitor comprising calcium phosphate in solid form; and introducing the composition in the well.

20. The method of claim 19, wherein the treatment is applied to the subterranean formation.

21. An aqueous environmentally friendly composition for use in oilfield application comprising:
   a friction reducer comprising an acrylamide copolymer, comprising 1 to 60 mole percent (2-acrylamido-2-hydroxy alkyl) lower trialkyl ammonium groups, and a salt in water;
   a biocide comprising an oxidizer diluted in water;
   and a scale inhibitor comprising a phosphorous compound in solid form.

22. An aqueous environmentally friendly composition for use in oilfield application comprising:
   a friction reducer comprising an acrylamide copolymer and a salt in water;
   a biocide comprising an oxidizer diluted in water;
   and a scale inhibitor comprising a phosphorous compound in solid frit form.

23. A method to treat a well penetrating a subterranean formation, comprising:
   providing a composition comprising a friction reducer comprising an acrylamide copolymer and a salt in water; a biocide comprising an oxidizer diluted in water; and a scale inhibitor comprising a phosphorous compound in solid form;
   and injecting the composition into the well at a pressure below the fracturing pressure of the subterranean formation.

* * * * *